Dec. 20, 1938.　　　　E. A. JOHNSTON　　　　2,140,631
COTTON PICKER
Filed April 6, 1937　　　5 Sheets-Sheet 1

Fig. 1

Inventor
Edward A. Johnston
By V. F. [signature]
Atty.

Dec. 20, 1938.  E. A. JOHNSTON  2,140,631
COTTON PICKER
Filed April 6, 1937   5 Sheets-Sheet 3

Inventor
Edward A. Johnston
By V. T. Laungre  Att'y

Dec. 20, 1938.  E. A. JOHNSTON  2,140,631
COTTON PICKER
Filed April 6, 1937    5 Sheets-Sheet 4

Fig. 4

Inventor
Edward A. Johnston
By V. F. Lassagne
Atty.

Dec. 20, 1938.  E. A. JOHNSTON  2,140,631
COTTON PICKER
Filed April 6, 1937  5 Sheets-Sheet 5

Patented Dec. 20, 1938

2,140,631

UNITED STATES PATENT OFFICE 2,140,631

COTTON PICKER

Edward A. Johnston, Chicago, Ill., assignor to International Harvester Company, a corporation of New Jersey Application April 6, 1937, Serial No. 135,303

38 Claims. (Cl. 56—43)

This invention relates to cotton pickers of the type employing rotating picker spindles which are projected into cotton plants and withdrawn therefrom during the travel of the machine.

More particularly, the invention relates to improvements in the drum construction, particularly as to the mounting and operation of the spindles, and to the doffing arrangement for removing cotton from the spindles.

The principal object of the invention is to provide a simplified drum construction which can be manufactured economically and which is constructed to be readily assembled into a durable machine.

Another object is to provide an improved spindle support, which is operative to position the spindles at the proper angle to obtain the most efficient picking operation and the most effective doffing.

These objects and others, which will be apparent from the detailed description to follow, are accomplished by a construction, a preferred form of which is shown in the drawings, in which:

Figure 2 is a sectional view taken on a horizontal plane through the cam member, which controls the positioning of the picker spindles. (Figure 2 may be considered as being taken on the section line 2—2 of Figure 3 insofar as the portion of the structure is shown in Figure 3);

Figure 1:
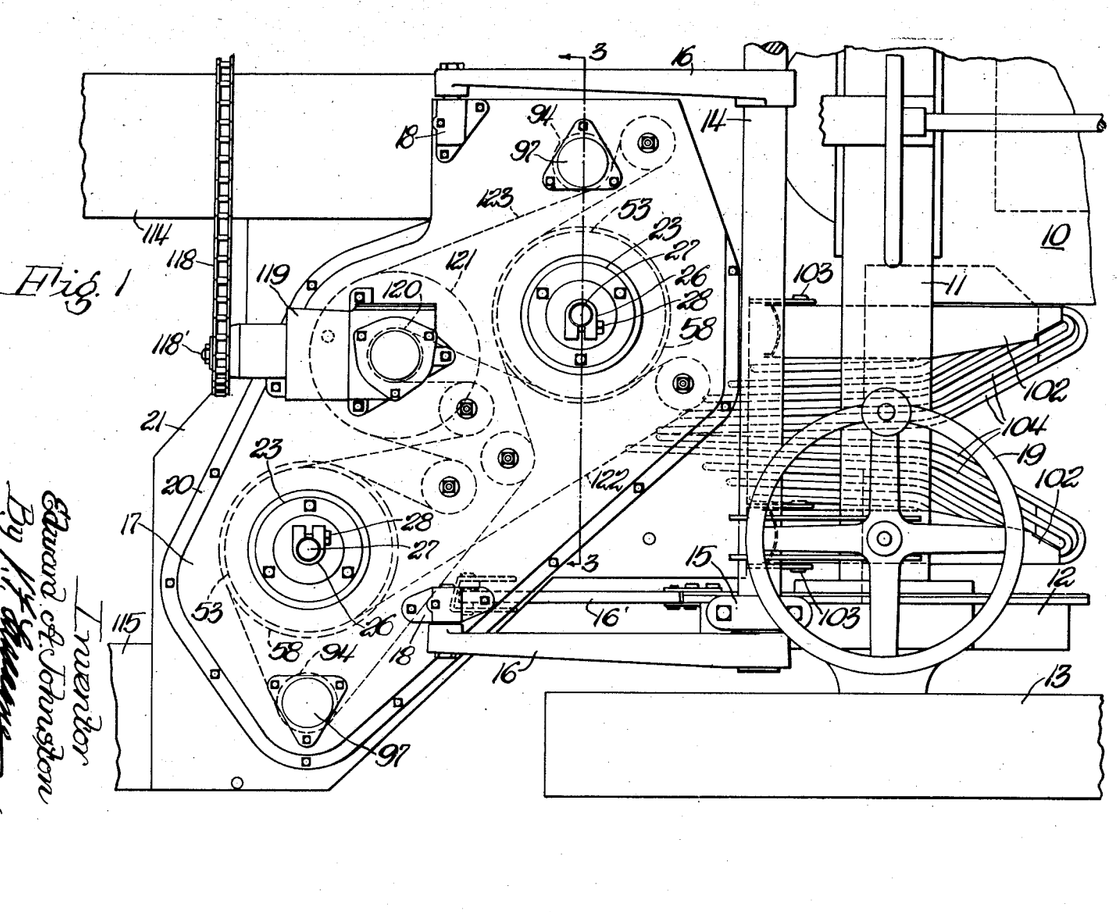
Figure 1 is a plan view, showing the rear portion of a tractor with a picker mounted thereon.
Figure 2:
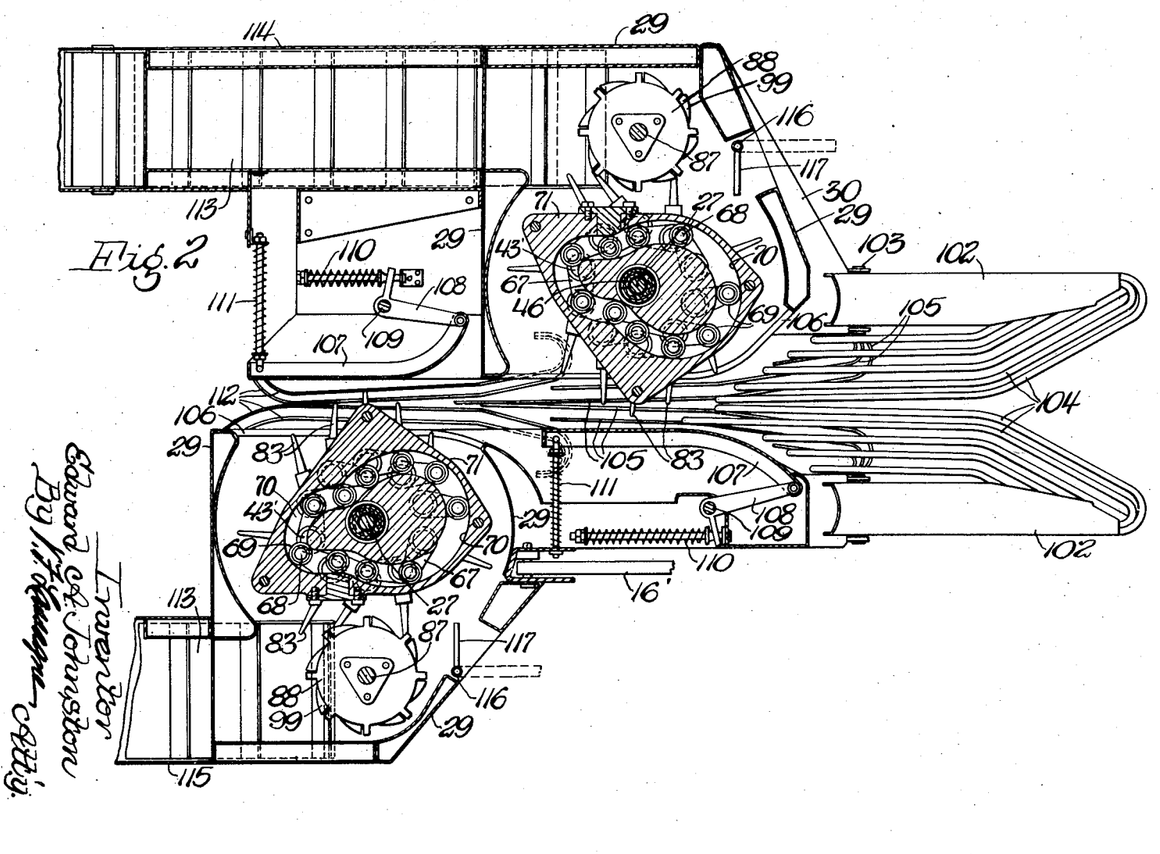

In the drawings the picker has been shown in connection with a tractor of the wide tread type, having a body portion 10 and extended rear axle 11, depending axle housings 12, and traction wheels 13. For supporting the picker, a transverse shaft 14 mounted for rocking at the rear of the tractor on brackets 15, one of which is shown, carries supporting arms 16 extending rearwardly. The picker consists essentially of a cast upper housing 17, to which the other housing portions are connected and from which the picking mechanism is suspended. Said housing is connected by brackets 18 to the supporting arms 16. In Figures 1 and 2, a lower link 16' is shown connecting the bottom of the picker with a lower point on the tractor. The construction for adjusting the height of the picker, which includes a hand wheel 19, illustrated, and other suitable mechanism, is not shown in detail, as it does not form a part of the present invention.

Figure 3:
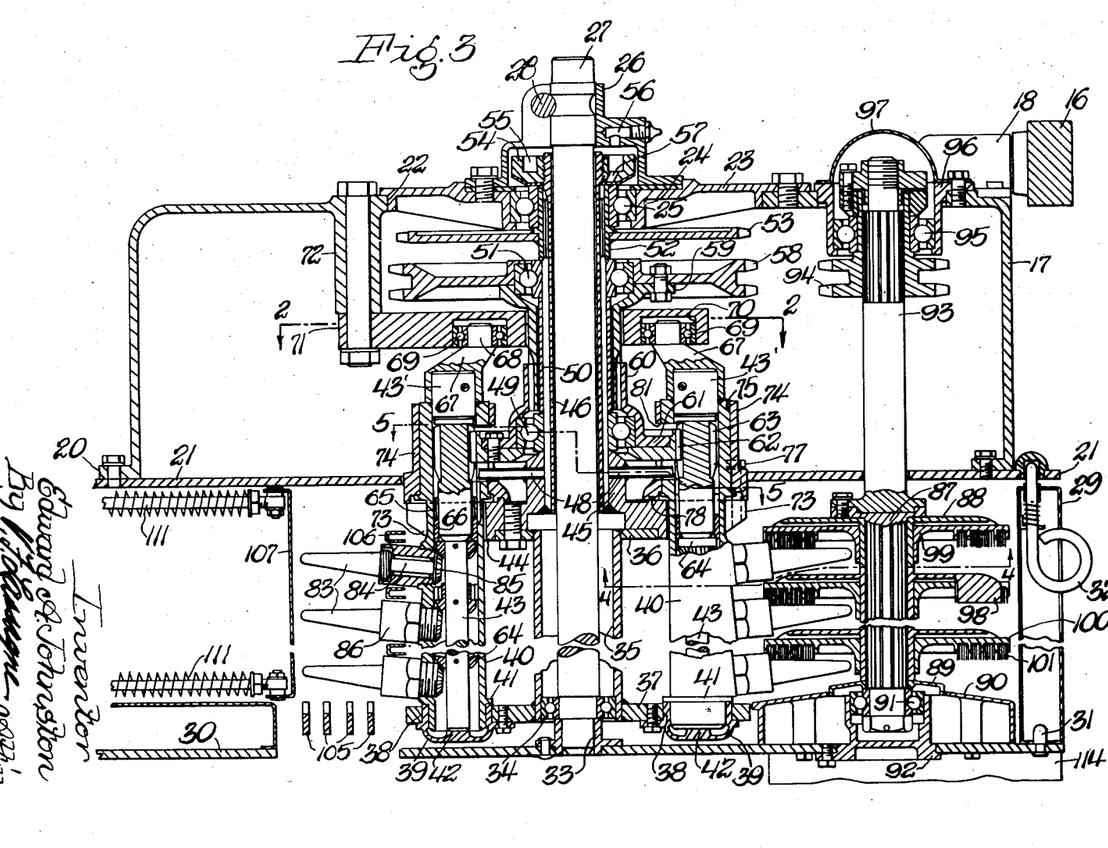
Figure 3 is a vertical, transverse section taken on the line 3—3 of Figure 1.

The housing 17 extends downwardly a substantial distance, as best shown in Figure 3, and is provided with a securing flange 20 extending around the lower edge. A flat plate 21, secured to the flange 20, forms a driving mechanism enclosure in which the chains and sprockets for driving the shafts are located.

The machine illustrated is of the two drum type. To position the drums, two openings 22 are formed in the top of the housing 17. Flanged plates 23 are fitted in said openings and secured to the housing. Said plate is provided with a cup portion 24 in which a ball bearing assembly 25 is fitted. Said bearing assembly is of the type adapted to take both radial and axial loads. A flanged cap 26 is fitted over the bearing assembly and secured to the top of the plate 23. Said cap is provided with a vertical bore in alignment with the axis of the bearing assembly. A shaft 27 extends through the bore downwardly therefrom. Said shaft is supported in position by a cap screw 28, which engages an annular groove around the shaft and clamps the shaft rigidly in the cap 26.

A plurality of housing sections 29, secured to the housing 17, extend downwardly to the bottom of the machine and are secured to the bottom plate 30. Certain of the sections, as shown in Figure 3, are removable to provide for access to the interior of the machine. At the right hand side of Figure 3, the section 29 is shown as fitted on a projecting lug 31 in the bottom plate and provided at its upper end with a spring pressed latch 32, which may be withdrawn to remove that section.

The bottom end of the shaft 27 is reduced in diameter and fitted in a journal member 33 mounted on the bottom plate. A ball bearing assembly 34 is also fitted near the end of the shaft 27 above the journal member 33. The outer race of said assembly is fitted into a sleeve 35. Said sleeve is secured by welding to an annular plate 36 at its upper end. At its lower end the sleeve 35 is secured by welding to an annular plate 37. Said plate is provided with a plurality of circumferentially spaced openings 38, into which flanged supporting members 39 are fitted, being secured to the annular member 37 by cap-screws. Said members form journals for the lower ends of the spindle supporting bars 40. Said bars are provided with flanges 41 contacting the upper edges of the members 38. Said members are closed at their bottom sides and are provided with raised portions 42, which form end bearings for the spindle driving shafts 43. Said shafts are centrally positioned in the supporting bars 40 and extend above the upper ends of said bars.

An upper supporting member 44 for the drum is formed with a recess on the lower side, in which the plate 36 is seated. Cap-screws fasten the plate rigidly to the member. Said member is provided with a hub portion 45, within which an externally splined sleeve 46 is mounted. The lower end of said sleeve is welded to the member 44 with the sleeve in spaced relation with respect to the shaft 27. The splined sleeve forms a plurality of oil conduits between the splines, as clearly shown in Figure 5. Each of the spaces between adjacent splines registers with the inlet end of an oil discharge conduit 48. Said conduits extend radially, terminating in a position to deliver oil to the spindle drive, as will be hereinafter described.

A ball bearing assembly 49 is fitted on the splined sleeve 46 with the inner race abutting the top of the hub 45. A spacer sleeve 50 is fitted over the sleeve 46, abutting the top of the inner race of the bearing assembly 49. A ball bearing assembly 51 is fitted over the sleeve 46 with the lower side of the inner race abutting the top of the spacer 50. An internally splined sleeve 52 is fitted onto the splined sleeve 46, abutting the top of the inner race of the bearing assembly 51. Said sleeve 52 is provided with a radial flange, against which a chain sprocket 53 is fitted and rigidly welded in position.

The ball bearing assembly 25 previously referred to abuts the flange formed on the sleeve 52 and is secured rigidly in position by a nut 54 threaded on the upper end of the sleeve 46.

The nut 54 is provided with an annular recess 55 extending downwardly from the top, which lies immediately under the inlet end of a lubricant conduit 56 formed in the cap 26. Lubricant supplied through a fitting at the inlet end of said conduit is delivered into the lubricant receiving recess 55, and therefrom through an opening 57 into the space between the sleeves 52 and 46. The lubricant then flows downwardly between the splines and outwardly through the discharge conduit 48.

A chain sprocket 58 is formed with a hub portion which fits over the outer race of the bearing assembly 51. A driving member 59, formed with a radial flange which is bolted to the sprocket 58, extends downwardly and is rotatably mounted with respect to the spacer 50. Said member 59 is externally splined at its lower end to form a driving connection with an internally splined spindle driving member 60. Said member is provided with a cylindrical bore at its lower end, which fits over the outer race of the bearing assembly 49. The member 60 is also provided with a radial flange 61, which is secured by cap-screws to a gear 62. Said gear meshes with driving gears 63 and forms driving means for the spindle driving shafts 43.

The driving gears 63 of said shafts are formed on an enlarged portion at the upper end of the shafts 43. The spindle supporting bars 40, the lower end mountings of which have been previously described, are formed interiorly at their upper ends with a cylindrical bore. A plurality of vertically spaced spindle driving gears 64 are pinned to each shaft 43 for rotation therewith within the bars 40. A plurality of needle bearing assemblies are mounted on the hubs of the gears 64 to form bearings to maintain the shafts centrally of the bores. At the upper end of each shaft 43, a needle bearing assembly 65 is fitted between the enlarged portion of the shaft and the interior bore. Said needle bearing is shown as seated above a spacer 66, which rests on the upper gear 64. At their upper ends the shafts 43 are journaled in members 43' welded into the top portions of the bars 40. To provide for oscillation of the spindle carrying bars 40 to change the angle of the picking spindles with respect to the drum, crank arms 67 are secured to the upper ends of the members 66. The crank arms are provided at their upper ends with stub shafts 68, which fit into the inner race of ball bearing assemblies 69. The outer race of said assemblies is adapted to follow a recess 70 provided as a cam track in a plate 71. Said plate is secured rigidly in position with respect to the housing 17 by means of bolts and downward extensions 72 in the housing 30, best shown in Figure 3. The plates 71 of the two drums are formed with central openings through which the driving members 59 extend.

Figures 5, 6, 7, 8:
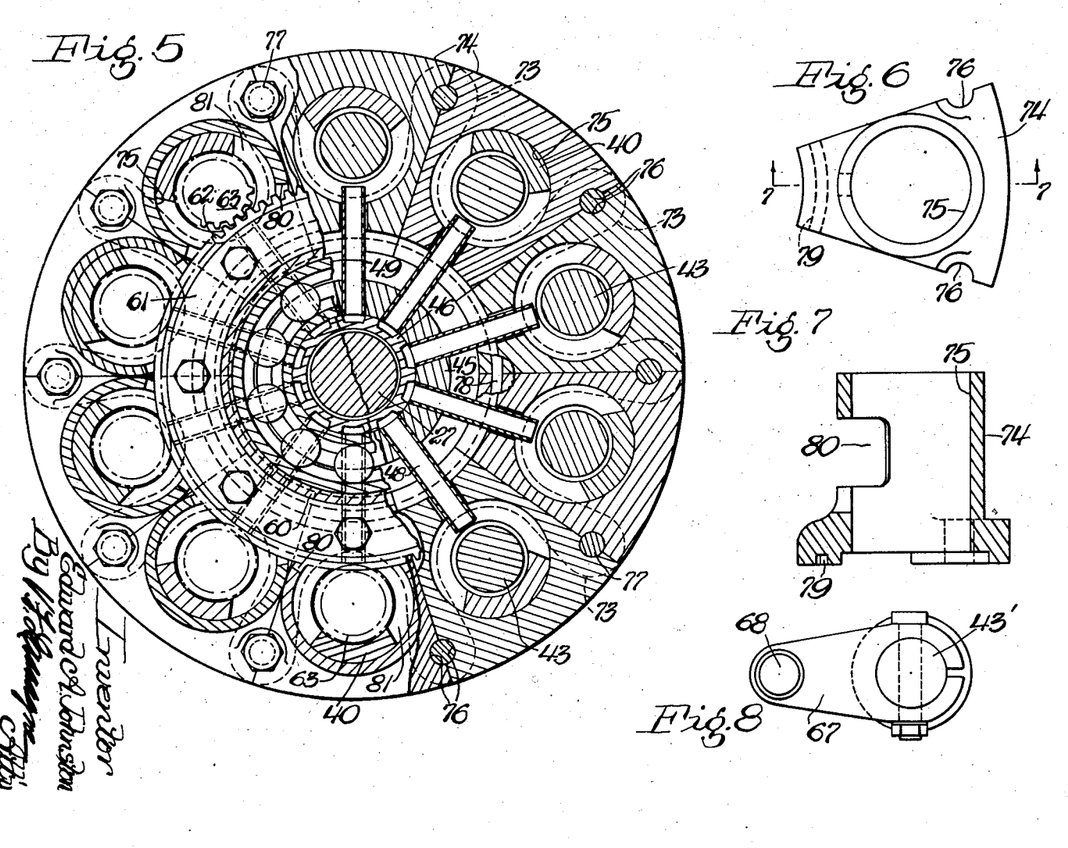
Figure 5 is a section taken substantially on the line 5—5 of Figure 3, with two of the spindle bar supporting members omitted, better to show the construction of the underlying parts.
Figure 6 is a plan view of one of the picker bar supporting members.
Figure 7 is a section on the line 7—7 of Figure 6.
Figure 8 is a plan view of one of the cranks for positioning the picker spindle bars.

The upper drum support 44 is provided with radial extensions 73, as best shown in Figure 5. Said extensions are spaced to form sockets through which the spindle supporting bars 40 extend. To provide means for supporting the upper ends of said bars, supporting members 74 are mounted on the member 44, being fitted over the extensions 73. The members 74 are provided with bores 75 in which cylindrical upper portions of the bars 40 are rotatably fitted. The members 74 are formed with faces lying on planes extending through the axis of the drum support whereby the adjacent members may be fitted together with the entire assembly of sections forming a complete annulus, as best shown in Figure 5.

To secure the adjacent sections or members 74 to the extension 73 of the upper drum support 44, mating notches 76 are formed in the contacting faces of the members 74 adjacent the outer ends thereof. Bolts 77 extend through the recesses, which together form a circular bore, and through openings provided in the extensions 73. To provide further means for positioning the members 74, an annular ledge 78 is formed on the upper face of the members 44, spaced inwardly from the sockets formed by the extensions 73. Each of the members 74 is provided with an arcuate slot 79, which fits on the ledge 78, thereby positioning the member against radial movement.

Each of the members 74 is provided with an arcuate slot 80 on the side adjacent the axis of the drum. Said slot is of a size sufficient to permit rotation of the spindle driving gear 62. The upper end of each bar 40 is also provided with a slot 81 to provide for meshing of the gear 62 with the gear 63 on the spindle driving shaft 43. This slot is necessarily of greater extent, as clearly shown in Figure 5, to provide for oscillation of the bars 40 as the cranks 67 follow the cam tracks 70.

Each bar 40 is provided with a plurality of threaded bores 82 into which the spindle assemblies are threaded. Each spindle assembly consists of a conical picking spindle 83 having a shank 84 of reduced diameter, on which a beveled drive gear 85 is fixed, and a journal member 86 which is threaded into the bore 82. The bearing construction of the spindle is not a part of the present invention and may be constructed with needle bearings as illustrated, and oil retaining means as shown by the spiral ridges, or in any other manner acceptable for the purpose in view. The angle of inclination of the spindles is, however, an important feature.

The spindles are evenly spaced vertically on the bars 40 and are spaced in alignment, so that they are arranged in rows around the drum. The angle of inclination of the spindle is such that the upper edges of each row lie in a plane perpendicular to the axis of the drum. This construction is to provide an area for doffing, as will be described.

In the operation of the picker the spindles are mounted so as to go into the plant, as best shown in Figure 2, substantially transversely to the direction of travel. It has been found that in this position the picking spindles are more effective in removing the maximum percentage of the cotton. However, for doffing, it is essential that the spindles be angled so that doffing may take place from the base toward the outer end. The cam track is, therefore, shaped to bring the spindles into the position shown on a large scale in Figure 4, as they approach the doffer.

A doffer shaft 87 is positioned vertically parallel to the axis of the drum structure. A plurality of disk-like elements 88 are splined onto the doffer shaft for rotation therewith. Said elements are also fixed against axial movement on the doffer shaft. Below the lowermost element, a downwardly flanged disk 89 is fitted freely rotatable in an opening formed in a shield 90. The shield 90 is mounted on the bottom plate 30. The disk 89 serves the purpose of preventing cotton from working its way downwardly around the end of the shaft.

A ball bearing assembly 91, fitted on the lower end of the doffer shaft 87, is also fitted in a flanged cup 92 rigidly secured to the bottom plate 30. The upper end of the doffer shaft 87 is flanged and is rigidly secured to a flange on a drive shaft 93. A chain sprocket 94 is splined on the upper end of the drive shaft 93. A ball bearing assembly 95, mounted on the hub of the sprocket 94, is fitted into a retaining member 96, which is secured to the upper wall of the housing 17. Suitable means, as illustrated, are provided for securing the sprocket and the bearing assembly in position on the drive shaft. A cover 97 is provided over the upper end of the shaft supporting means.

Figure 4:
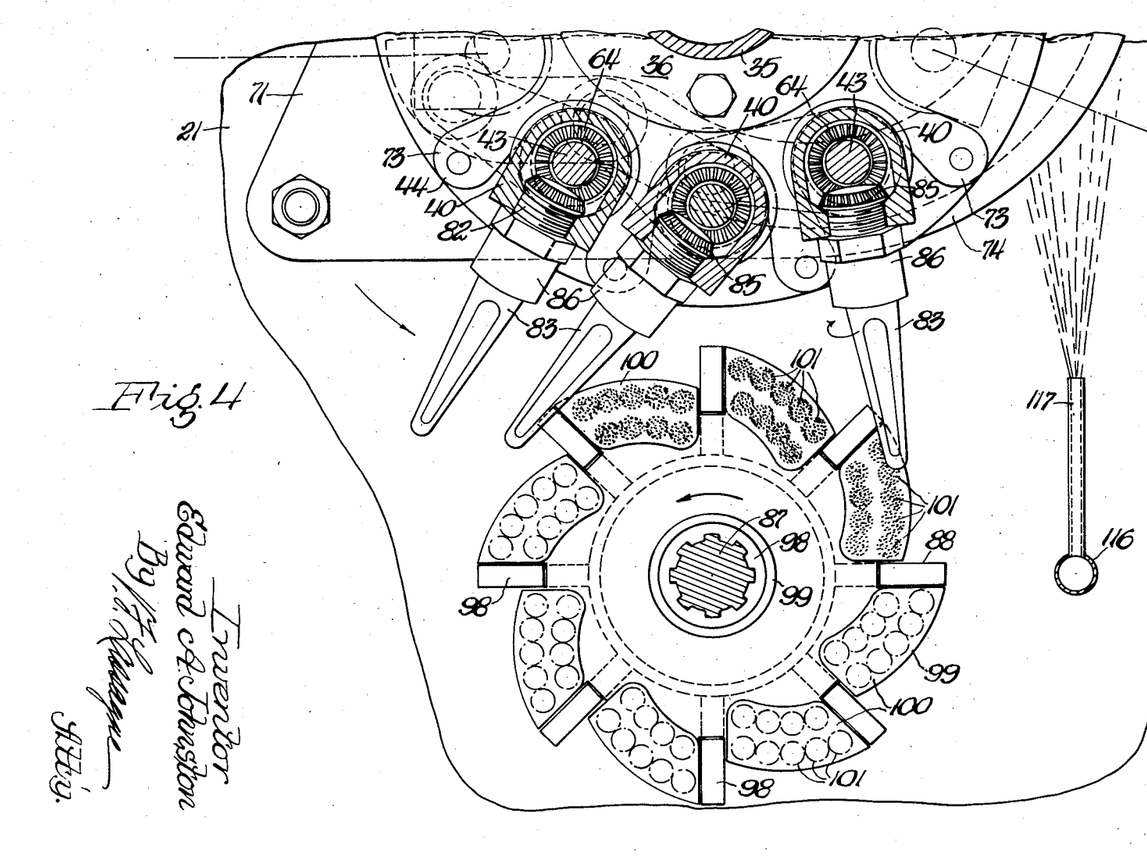
Figure 4 is a section taken on the line 4—4 of Figure 3.

As shown in the broken away portion at the upper end of the doffer in Figure 3, the members 88 are provided with bar-type doffer elements 98. These elements are also shown in Figure 4. Slidably mounted on the hubs of the members 88 are secondary doffing members 99. Said members are shaped with a plurality of eccentric portions 100, as shown in Figure 4, with recesses formed between the ends of said portions, through which the elements 98 extend. Said elements act to hold the members 99 for rotation with the members 88, while permitting axial movement of the two members. The portions 100 are provided with a plurality of groups of doffing bristles 101 extending downwardly for contact with the upper edges of the spindles as they move across the path of the brushes during rotation of the drum. The brushes are held in contact with the spindles by the weight of the members 99, this being sufficient to obtain the desired contact.

The drum construction and the doffer construction have been described in detail, also the means by which these units are mounted on the upper housing 17, which forms a basic support for the entire machine. The housing sections 29 have also been referred to as extending downwardly from the housing 17 and being secured by suitable means to the bottom plate 30.

As illustrated in Figure 2, guide members 102 are mounted on pivot pins 103 carried on the bottom plate on the forward housing sections 29. Said guide members are provided with a plurality of spring rods 104 shaped to engage plant stalks and direct them into the throat of the machine. The rods are also formed to pick up loose branches and bolls and to direct them into the machine. A secondary series 105 of spring rods for picking up loose material is shown beneath the rods 104 and rearwardly thereof. These may be secured to the lower side of the machine in any suitable manner.

As best shown in Figure 2, forwardly of the forward drum structure a series of channel-shaped guide elements 106 is secured to one of the forward housing sections 29, extending backwardly between the vertical rows of spindles and being secured at their rear ends to a second of the vertical housing sections 29. These guide elements are shown also in cross section between the picking spindles in Figure 3. A similar series of guide elements are provided for the rear drum. Opposite the elements 106, a spring pressed sheet metal deflector 107 is mounted at its forward end on a vertical axis on arms 108, which are pivoted on a vertical shaft 109 mounted on the housing structure. A compression spring device 110 is utilized to urge the shield toward the picking drum, thereby pushing the cotton plants into the path of the spindles. The rear end of the shield 107 is resiliently urged toward the drum structure by a compression spring device 111. Substantially the same construction is used for maintaining the plants in contact with the rear drum and the corresponding parts bear the same numerals. A third set of spring bars 112 extends rearwardly from the rear ends of the bars 105 to pick up the loose cotton and branches and to raise them up to the lower spindles whereby the cotton may be removed.

To illustrate removal of the cotton from the machine, a belt conveyor 113 has been shown for the unit on the left, said conveyor being mounted in a housing 114 extending rearwardly. A similar conveyer has been shown at the right hand side of the machine extending rearwardly in a housing 115. The disposal of the cotton as it is removed by the doffer has not been shown in detail in this application, as such constructions are well known in the prior art.

To provide means for wetting the spindles to clean them during operation, vertical water pipes 116 are mounted on the housing structure. Said pipes may be supplied with water through any suitable means. Adjacent each vertical row of spindles, a horizontal pipe 117 of small diameter extends from the pipe 116 for projecting water against the spindles.

As shown in the plan view in Figure 1, a drive chain 118 adapted to be operated from the tractor power take-off drives a shaft 118' extending into a casing 119 mounted on the housing 17. The gearing in said housing transmits the power to a vertical shaft which drives gears 120 and 121 shown in dotted lines. A chain 122, shown in dotted lines, engaging the gear 120 encircles properly located idler sprockets and the sprockets 53 for rotating the drum structures. A chain 123 extending around the sprocket 121 and suitable idler sprockets engage the sprockets 94 on the doffer shaft and the sprockets 58 on the drum structure for rotating the picking spindles. This driving mechanism has been shown only diagrammatically, as any suitable driving mechanism may be provided.

The operation of the machine as above described has been explained in considerable detail in connection with the description of the elements. As the machine moves along the field, the plants are directed into the throat formed by the deflector 107 and the guide elements 106 between the rows of spindles. The spindles, rotated by drive mechanism which is provided and carried on the rotating drum, are directed into the plants at an angle determined by the shape of the cam track in which the crank arms on the spindle supporting bars operate. As the spindles begin rotation, they are angled by said cam means to be positioned as they engage the doffer elements to obtain the most effective doffing. By arranging the spindles at an angle, as described, with respect to the axis of the drum, and by bringing the spindles into the doffing area in order to obtain a doffing angle at substantially a tangent, a very effective doffing mechanism has been devised. It is in the relationship of these parts that the principal feature of the invention resides. After leaving the throat of the machine, which effects the first picking operation, the cotton plant is engaged by the rear shield 107 and the rear guide members 106, directing the plant thereby into a position where it may be properly engaged by the spindles of the second picking unit. By means of the two staggered units the cotton is effectively picked from the opposite sides whereby a very high percentage of cotton may be removed from the plant.

It is to be understood that applicant has shown and described substantially all of the mechanism of a complete cotton picker. This has been done in order to form an adequate disclosure of the invention and of certain particular units which are defined in the claims as embodying the invention.

What is claimed is:

1. In a drum construction for cotton pickers, the combination of a rotatably mounted carrier structure having a plurality of radially extending circumferentially spaced extensions forming sockets therebetween, spindle carrying bars mounted for oscillation on the carrier structure with their end portions extending through the sockets, a bar support fitted on each bar, and means for securing each of said supports to the carrier structure for independent removal therefrom in a radial direction between the spaced extensions.

2. In a drum construction for cotton pickers, the combination of a rotatably mounted carrier structure having a plurality of radially extending circumferentially spaced extensions forming sockets therebetween, spindle carrying bars mounted for oscillation on the drum structure with their end portions extending through the sockets, a bar support fitted in each socket and having portions overlapping two adjacent extensions, and means for securing each of said supports to the carrier structure for independent removal therefrom in a radial direction between the spaced extensions.

3. In a drum construction for cotton pickers, the combination of a rotatably mounted carrier structure having a plurality of radially extending circumferentially spaced portions forming sockets therebetween, an annular rib on the carrier structure spaced inwardly from the sockets, spindle carrying bars mounted on the carrier structure with their end portions extending through the sockets, a bar support over each socket, said supports having portions overlapping the annular ribs and formed with arcuate slots engaging the ribs, and means for securing said supports to the carrier.

4. In a drum construction for cotton pickers, the combination of a rotatably mounted carrier structure having a plurality of radially extending circumferentially spaced portions forming sockets therebetween, abutment means on the carrier structure, spindle carrying bars mounted on the carrier structure with their end portions extending though the sockets, a bar support over each socket, said supports being formed with abutment means engageable with the abutment means on the carrier structure to hold the supports against radial movement, and means for securing said supports to the carrier.

5. In a drum construction for cotton pickers, the combination of a rotatably mounted carrier structure having a plurality of radially extending circumferentially spaced portions forming sockets therebetween, hollow spindle carrying bars mounted on the carrier structure with their end portions extending through the sockets, a bar support fitted in each socket and secured to the carrier structure, said supports having portions engaged with portions of the carrier structure to hold the support against radial outward movement, spindle driving shafts rotatably mounted in the bars, means carried by the carrier structure for driving said shafts, and means for independently oscillating the bar during rotation of the carrier structure.

6. In a drum construction for cotton pickers, the combination of a rotatably mounted carrier structure having a plurality of radially extending circumferentially spaced portions forming sockets therebetween, a retaining rib on the carrier structure spaced inwardly from the sockets, spindle carrying bars mounted on the carrier structure with their end portions extending through the sockets, a bar support fitted in each socket, said supports having portions overlapping the retaining rib and formed with means engaging said rib to hold the supports against radial outward movement, and means for securing said supports to the carrier.

7. In a drum construction for cotton pickers, the combination of a carrier structure having a plurality of radially extending circumferentially spaced portions forming sockets therebetween, spindle carrying bars mounted on the carrier structure with their end portions extending through the sockets, a bar support fitted over each socket, said supports being formed as sectors having radial faces adapted to engage the adjacent faces of adjacent supports.

8. In a drum construction for cotton pickers, the combination of a carrier structure having a plurality of radially extending circumferentially spaced portions forming sockets therebetween, spindle carrying bars mounted on the carrier structure with their end portions extending through the sockets, a bar support fitted over each socket, said supports being formed as sectors having radial faces adapted to engage the adjacent faces of adjacent supports, said supports being formed with mating notches in the contacting faces of the adjacent member, and securing elements extending through the openings formed by said notches.

9. In a drum construction for cotton pickers, the combination of a carrier structure having a plurality of radially extending circumferentially spaced portions forming sockets therebetween, hollow spindle carrying bars mounted on the carrier structure with their end portions extending through the sockets, a bar support fitted over each socket, said supports being shaped as sectors of an annulus having radial faces adapted to engage the adjacent faces of adjacent supports, means for securing said supports to the carrier structure, a shaft in each bar for driving spindles carried thereby, a gear formed on the upper end of each shaft, the hollow bars and the supports being formed with aligned arcuate slots adjacent said gears, and a master driving gear mounted on the carrier structure in mesh with each of the gears or the spindle driving shafts.

10. In a drum construction for cotton pickers, the combination of a rotatable structure having a radially extending portion, hollow spindle carrying bars mounted for oscillation on the carrier structure with their end portions rotatably supported by said portion, a bar support fitted on each bar and secured to the carrier structure, a shaft in each bar for driving spindles carried thereby, a gear formed on the upper end of each shaft, the hollow bars and the supports being formed with aligned arcuate slots adjacent said gears, and a master driving gear mounted on the carrier structure in mesh with each of the gears or the spindle driving shafts.

11. In a drum construction for cotton pickers, the combination of a rotatable carrier structure having a radially extending portion, hollow spindle carrying bars mounted for oscillation on the carrier structure with their end portions rotatably supported by said portion, a bar support fitted on each bar and secured to the carrier structure, a shaft in each bar for driving spindles carried thereby, a gear formed on the upper end of each shaft, the hollow bars and the supports being formed with aligned arcuate slots adjacent said gears, lubricant conduits mounted on the carrier structure and extending through said slots, and a master driving gear mounted on the carrier structure in mesh with each of the gears or the spindle driving shafts.

12. In a drum construction for cotton pickers, the combination of a rotatable carrier structure having a radially extending portion, hollow spindle carrying bars mounted for oscillation on the carrier structure with their end portions rotatably supported by said portion, a bar support fitted on each bar and secured to the carrier structure, a shaft in each bar for driving spindles carried thereby, a gear formed on the upper end of each shaft, the hollow bars and the supports being formed with aligned arcuate slots adjacent said gears, lubricant conduits mounted on the carrier structure and extending through said slots, a master driving gear mounted on the carrier structure in mesh with each of the gears or the spindle driving shafts, and means for oscillating the spindle carrying bars, the slots being of an arcuate width sufficient to allow sufficient clearance for the required angular movement.

13. In a drum construction for cotton pickers, and in combination, a vertical shaft adapted to be mounted on a supporting structure, a sleeve surrounding said shaft, an upper supporting member secured to said sleeve, a lower supporting member secured to said sleeve, said lower supporting member being provided with a plurality of journals circumferentially spaced around the periphery thereof, a plurality of spindle supporting bars mounted with their lower ends in said journals, the upper supporting member being provided with a plurality of circumferentially spaced extensions forming sockets therebetween, said spindle supporting bars being positioned in said sockets, and journal members for the upper ends of said spindle supporting bars, said journal members being secured to the upper supporting member.

14. In a drum construction for cotton pickers, and in combination, a vertical shaft adapted to be suspended from a supporting structure, a sleeve surrounding said shaft and supported against axial movement with respect thereto, a radially extending upper supporting member secured to said sleeve, a lower radially extending supporting member secured to said sleeve, said lower supporting member being provided with a plurality of journals circumferentially spaced around the periphery thereof, a plurality of spindle supporting bars mounted with their lower ends in said journals, the upper supporting member being provided with a plurality of circumferentially spaced extensions forming sockets therebetween, said spindle supporting bars extending through said sockets, and journal members for the upper ends of said bars, said journal members being secured to the upper supporting member.

15. In a drum construction for cotton pickers, and in combination, a vertical shaft adapted to be mounted on a supporting structure, a sleeve surrounding said shaft, an upper supporting member secured to said sleeve, a lower supporting member secured to said sleeve, said lower supporting member being provided with a plurality of journals circumferentially spaced around the periphery thereof, a plurality of spindle supporting bars mounted with their lower ends in said journals, the upper supporting member being provided with a plurality of circumferentially spaced extensions forming sockets therebetween, said spindle supporting bars extending through said sockets, journal members for the upper ends of said spindle supporting bars, said members being formed with portions lying on the top of the upper support and bridging the sockets therein.

16. In a drum construction for cotton pickers, and in combination, a vertical shaft adapted to be suspended from a supporting structure, a sleeve surrounding said shaft and supported against axial movement with respect thereto, a radially extending upper supporting member secured to said sleeve, a radially extending lower supporting member secured to said sleeve, said lower supporting member being provided with a plurality of journals circumferentially spaced around the periphery thereof, a plurality of spindle supporting bars mounted with their lower ends in said journals, the upper supporting member being provided with a plurality of circumferentially spaced extensions forming sockets therebetween, said spindle supporting bars extending through said sockets, journal members for the upper ends of said spindle supporting bars secured to the upper support, said members being formed with portions lying on the top of the upper support and bridging the sockets therein.

17. In a drum construction for cotton pickers, and in combination, a vertical shaft adapted to be carried by a supporting structure, a sleeve surrounding said shaft, an upper supporting member secured to said sleeve, a lower supporting member secured to said sleeve, said lower supporting member being provided with a plurality of journals circumferentially spaced around the periphery thereof, a plurality of spindle supporting bars mounted with their lower ends in said journals, the upper supporting member being provided with a plurality of circumferentially spaced extensions forming sockets therebetween, said spindle supporting bars being positioned in said sockets, and journal members for the upper ends of said spindle supporting bars, said members bridging the sockets and being formed with their radial faces lying in vertical planes intersecting the axis of the drum whereby adjacent members together form an annulus.

18. In a drum construction for cotton pickers, and in combination, a vertical shaft adapted to be suspended from a supporting structure, a sleeve surrounding said shaft, a radially extending upper supporting member secured to said sleeve, a radially extending lower supporting member secured to said sleeve, said lower supporting member being provided with a plurality of journals circumferentially spaced around the periphery thereof, a plurality of spindle supporting bars mounted with their lower ends in said journals, the upper supporting member being provided with a plurality of circumferentially spaced extensions forming sockets therebetween, said spindle supporting bars extending through said sockets, and journal members for the upper ends of said spindle supporting bars, said members being fitted above the spaced extensions bridging the sockets therebetween and being formed in segments of an annulus with their radial faces lying in vertical planes intersecting the axis of the drum whereby the members together form an annulus.

19. In a drum construction for cotton pickers, and in combination, a sleeve adapted to be rotatably supported on a substantially vertical axis, an upper supporting member secured to said sleeve, a lower supporting member secured to said sleeve, said lower supporting member being provided with a plurality of journals circumferentially spaced around the periphery thereof, a plurality of spindle supporting bars mounted with their lower ends in said journals, the upper support being provided with a plurality of circumferentially spaced extensions forming sockets therebetween, said spindle supporting bars being positioned in said sockets, and supporting members for the upper ends of said spindle supporting bars, said members lying on top of the upper support and bridging the sockets, said members being formed as segments of an annulus whereby the members together form an annulus, said members being formed with mating notches and bolts extending through said notches and into the upper supporting member for holding the member in position.

20. In a drum construction for cotton pickers, and in combination, a shaft adapted to be suspended in a vertical position from a supporting structure, a drum structure rotatably mounted on said shaft, said structure including an upper driving sleeve, an upper radially extending supporting member and a lower radially extending supporting member, a plurality of spindle supporting bars journaled in the lower supporting member at circumferentially spaced locations, the upper support being provided with a plurality of inwardly extending sockets around the periphery thereof, said spindle supporting bars being positioned in said sockets, journal members for the upper ends of the spindle supporting bars, said journals being fitted into the sockets and secured therein, means for oscillating the picker supporting bars, said bars being hollow and being provided with a drive shaft for the picking spindles, said journals being formed with arcuate slots on the side adjacent the center of the drum, a drive gear rotatably mounted on the upper sleeve of the drum structure, the periphery of said gear extending through the slots in the journal members for rotating the spindle driving shafts, and means for rotating said gear independently of the drum structure.

21. In a cotton picker having a supporting frame structure and a rotatable drum carried thereby, and in combination therewith, a series of spindle supporting members circumferentially spaced around the drum mounted for oscillation on axes parallel to the axis of the drum, a series of rotatable conical picking spindles mounted on each of said members at an angle with respect thereto, said spindles being arranged in axially spaced circumferential rows and one edge of the spindles lying in a plane perpendicular to the axis of the drum, a doffer structure mounted on an axis parallel to the axis of the drum and spaced therefrom, axially spaced doffer elements mounted on said shaft, each element positioned adjacent a row of the picking spindles, said elements describing an arcuate doffing area during rotation of the doffer, and means for oscillating the spindle supporting members during rotation of the drum to bring the spindles into the doffing area at substantially a tangent thereto with the doffer rotating in a direction such that the doffing elements move along the spindles from the bases thereof towards the outer ends thereof.

22. In a cotton picker having a supporting frame structure and a rotatable drum carried thereby, and in combination therewith, a series of spindle supporting members circumferentially spaced around the drum mounted for oscillation on axes parallel to the axis of the drum, a series of rotatable conical picking spindles mounted on each of said members at an angle with respect thereto, said spindles being arranged in axially spaced circumferential rows and lying in a plane perpendicular to the axis of the drum, a crank rigidly connected to each of said members, a cam track mounted on the frame structure at one end of the drum, a crank means on each crank constructed to follow said cam track and to thereby alter the position of the spindle carrying member during rotation of the drum, a doffer structure mounted on an axis parallel to the axis of the drum and spaced therefrom, and axially spaced doffer elements mounted on said shaft, each element positioned adjacent a row of the picking spindles, said elements describing an arcuate doffing area during rotation of the doffer and said cam track being shaped to bring the spindles into the doffing area at substantially a tangent thereto with the doffer rotating in a direction such that the doffing elements move along the spindles from the bases thereof towards the outer ends thereof.

23. In a cotton picker having a supporting frame structure and a rotatable drum carried thereby, and in combination therewith, a series of hollow spindle supporting members circumferentially spaced around the drum and mounted for oscillation on axes parallel to the axis of the drum, a series of rotatable conical picking spindles mounted on each of said members at an angle with respect thereto with one edge of each lying in a plane perpendicular to the axis of the drum, a spindle driving shaft rotatably mounted in each supporting member, means for driving said shafts, a crank rigidly connected to each of said supporting members, a cam track mounted on the frame structure at one end of the drum, a crank pin at the end of each crank constructed to follow said cam track and to thereby alter the position of the spindle carrying member during rotation of the drum, a doffer structure mounted on an axis parallel to the axis of the drum and spaced therefrom, and axially spaced doffer disks mounted on said shaft, each disk positioned adjacent a row of the picking spindles, said disks describing an arcuate doffing area during rotation of the doffer and said cam track being shaped to bring the spindles into the doffing area at substantially a tangent thereto with the doffer rotating in a direction such that the doffing portions of the disks move along the spindles from the bases thereof towards the outer ends thereof.

24. In a cotton picker having a supporting frame structure and a rotatable drum carried thereby, and in combination therewith, a series of hollow spindle supporting members circumferentially spaced around the drum and mounted for oscillation on axes parallel to the axis of the drum, a series of rotatable conical picking spindles mounted on each of said members at an angle with respect thereto with one edge of each lying in a plane perpendicular to the axis of the drum, a spindle driving shaft rotatably mounted in each supporting member, means for driving said shafts, a crank rigidly connected to each of said supporting members, a cam track mounted on the frame structure at one end of the drum, a crank pin at the end of each crank constructed to follow said cam track and to thereby alter the position of the spindle carrying member during rotation of the drum, a doffer structure mounted on an axis parallel to the axis of the drum and spaced therefrom, and axially spaced doffer disks mounted on said shaft, each disk positioned adjacent a row of the picking spindles and being provided with a series of circumferentially spaced doffing elements, said elements describing an arcuate doffing area during rotation of the doffer and said cam track being shaped to bring the spindles into the doffing area at substantially a tangent thereto with the doffer rotating in a direction such that the doffing portions of the disks move along the spindles from the bases thereof toward the outer end thereof.

25. In a drum construction for cotton pickers having a casing and a source of driving power therein, the combination of a rotatable drum structure including a vertical shaft and vertically spaced supporting members, spindle supporting bars mounted on said member for oscillation, means supported on the casing for oscillating said bars during rotation of the drum, means surrounding said vertical shaft to form an annular lubricant reservoir, and a lubricant conduit extending from the reservoir to each spindle supporting bar.

26. In a drum construction for cotton pickers having a casing and a source of driving power therein, the combination of a rotatable drum structure including a vertical shaft and vertically spaced supporting members, spindle supporting bars mounted on said members for oscillation, means supported on the casing for oscillating said bars during rotation of the drum, means surrounding said vertical shaft to form an annular lubricant reservoir, a lubricant conduit extending from the reservoir to each spindle supporting bar, and means to supply lubricant to the reservoir during rotation of the drum structure.

27. In a drum construction for cotton pickers having a casing and a source of driving power therein, the combination of a rotatable drum structure including a vertical shaft and vertically spaced supporting members, hollow spindle supporting bars mounted on said members for oscillation, means supported on the casing for oscillating said bars during rotation of the drum, a spindle driving shaft rotatably mounted in each of the supporting bars, means mounted on the drum structure for driving said shafts, sleeve means surrounding said shaft to form a lubricant reservoir therebetween, a lubricant conduit extending from the reservoir to each spindle supporting bar, and means to supply lubricant to the reservoir during rotation of the drum structure.

28. In a drum construction for cotton pickers having a casing and a source of driving power therein, the combination of a drum structure rotatably mounted in the casing and including a vertical drum shaft and vertically spaced supporting members, hollow spindle supporting bars mounted for oscillation on said supporting members, means supported on the casing for oscillating said bars during rotation of the drum, a spindle driving shaft rotatably mounted in each of the supporting bars, means on the drum structure for driving said shafts, said bars being formed with slots to provide for said driving means, means surrounding the drum shaft to form an annular lubricant reservoir, and a lubricant conduit extending from the reservoir to each spindle supporting bar, said conduits extending through the slots.

29. In a drum construction for cotton pickers having a casing and a source of driving power therein, the combination of a drum structure rotatably mounted in the casing and including a vertical drum shaft and vertically spaced supporting members, spindle bar supports mounted on the upper supporting members, hollow spindle supporting bars mounted for oscillation in said supports, means supported on the casing for oscillating said bars during rotation of the drum, a spindle driving shaft rotatably mounted in each of the supporting bars, means on the drum structure for driving said shafts, said supports and said bars being formed with aligned slots to provide for said driving means, means surrounding the drum shaft to form an annular lubricant reservoir, and a lubricant conduit extending from the reservoir to each spindle supporting bar, said conduits extending through the aligned slots.

30. In a drum construction for cotton pickers having a casing and a source of driving power therein, the combination of a drum structure rotatably mounted in the casing and including a vertical drum shaft and vertically spaced supporting members, spindle bar supports mounted on the upper supporting members, spindle supporting bars mounted for oscillation in said supports, means supported on the casing for oscillating said bars during rotation of the drum, a spindle driving shaft rotatably mounted in each of the supporting bars, means on the drum structure for driving said shafts, said supports being formed with slots to provide for said driving means, means surrounding the drum shaft to form an annular lubricant reservoir, and a lubricant conduit extending from the reservoir to each spindle supporting bar, said conduits extending through the slots.

31. In a drum construction for cotton pickers having a casing and a source of driving power therein, the combination of a drum structure rotatably mounted in the casing and including a vertical drum shaft and vertically spaced supporting members, hollow spindle supporting bars mounted for oscillation on said supporting members, means supported on the casing for oscillating said bars during rotation of the drum, a spindle driving shaft mounted in each of the supporting bars, a driving gear on each shaft near the upper end thereof, a driving gear on the drum structure of a size and positioned to engage all of the driven gears for driving said shafts, said bars being formed with slots to provide for said driving gear, means surrounding the drum shaft to form an annular lubricant reservoir, and a lubricant conduit extending from the reservoir to each spindle driving gear, said conduits extending through the slots.

32. In a drum construction for cotton pickers having a casing and a source of driving power therein, the combination of a drum structure rotatably mounted in the casing and including a vertical drum shaft and vertically spaced supporting members, spindle bar supports mounted on the upper supporting members, hollow spindle supporting bars mounted for oscillation in said supports, means supported on the casing for oscillating said bars during rotation of the drum, a spindle driving shaft rotatably mounted in each of the supporting bars, a driving gear in each shaft near the upper end thereof, a driving gear on the drum structure of a size and positioned to engage all of the driven gears for driving said shafts, said supports and said bars being formed with aligned slots to provide for said driving gear, means surrounding the drum shaft to form an annular lubricant reservoir, and a lubricant conduit extending from the reservoir to each spindle driving gear, said conduits extending through the slots.

33. In a drum construction for cotton pickers, the combination of a carrier structure having a plurality of radially extending circumferentially spaced portions forming sockets therebetween, hollow spindle carrying bars mounted on the carrier structure with their end portions extending through the sockets, a bar support fitted over each socket, said supports being shaped as sectors of an annulus having radial faces adapted to engage the adjacent faces of adjacent supports, means for securing said supports to the carrier structure, a shaft in each bar for driving spindles carried thereby, a gear formed on the upper end of each shaft, the supports being formed with slots adjacent said gears, and a master driving gear mounted on the carrier structure in mesh with each of the gears of the spindle driving shafts.

34. In a drum construction for cotton pickers, the combination of a rotatable structure having a radially extending portion, hollow spindle carrying bars mounted for oscillation on the carrier structure with their end portions rotatably supported by said portion, a bar support fitted on each bar and secured to the carrier structure, a shaft in each bar for driving spindles carried thereby, a gear formed on the upper end of each shaft, the hollow bars being formed with arcuate slots adjacent said gears, and a master driving gear mounted on the carrier structure in mesh with each of the gears of the spindle driving shafts.

35. In a drum construction for cotton pickers, the combination of a rotatable structure having a radially extending portion, hollow spindle carrying bars mounted for oscillation on the carrier structure with their end portions rotatably supported by said portion, a bar support fitted on each bar and secured to the carrier structure, a shaft in each bar for driving spindles carried thereby, a gear formed on the upper end of each shaft, the supports being formed with slots adjacent said gears, and a master driving gear mounted on the carrier structure in mesh with each of the gears of the spindle driving shafts.

36. In a drum construction for cotton pickers, the combination of a rotatable carrier structure having a radially extending portion, hollow spindle carrying bars mounted for oscillation on the carrier structure with their end portions rotatably supported by said portion, a shaft in each bar for driving spindles carried thereby, a gear formed on the upper end of each shaft, the hollow bars being formed with arcuate slots adjacent said gears, lubricant conduits mounted on the carrier structure and extending through said slots, and a master driving gear mounted on the carrier structure in mesh with each of the gears of the spindle driving shafts.

37. In a cotton picker having a supporting frame structure and a rotatable drum carried thereby, and in combination therewith, a series of spindle supporting members circumferentially spaced around the drum mounted for oscillation on axes parallel to the axis of the drum, each of said members being independently mounted whereby each is individually removable, a series of rotatable conical picking spindles mounted on each of said members at an angle with respect thereto, said spindles being arranged in axially spaced circumferential rows and one edge of the spindles lying in a plane perpendicular to the axis of the drum, a doffer structure mounted on an axis parallel to the axis of the drum and spaced therefrom, axially spaced doffer elements mounted on said shaft, each element positioned adjacent a row of the picking spindles, said elements describing an arcuate doffing area during rotation of the doffer, and means for oscillating the spindle supporting members during rotation of the drum to bring the spindles into the doffing area at substantiallly a tangent thereto with the doffer rotating in a direction such that the doffing elements move along the spindles from the bases thereof towards the outer ends thereof.

38. In a cotton picker having a supporting frame structure and a rotatable drum carried thereby, and in combination therewith, a series of spindle supporting members circumferentially spaced around the drum mounted for oscillation on axes parallel to the axis of the drum, a series of rotatable conical picking spindles mounted on each of said members at an angle with respect thereto, said spindles being arranged in axially spaced circumferential rows and one edge of the spindles lying in a plane perpendicular to the axis of the drum, a doffer structure mounted on an axis parallel to the axis of the drum and spaced therefrom, axially spaced doffer elements mounted on said shaft, each element positioned adjacent a row of the picking spindles, said elements describing an arcuate doffing area during rotation of the doffer, and means including arms on the supporting members and means on the frame structure for oscillating the spindle supporting members during rotation of the drum to bring the spindles into the doffing area at substantially a tangent thereto with the doffer rotating in a direction such that the doffing elements move along the spindles from the bases thereof towards the outer ends thereof.

EDWARD A. JOHNSTON.